United States Patent [19]

Perez-Mendez

[11] 3,842,373
[45] Oct. 15, 1974

[54] RADIATION CAMERA AND DELAY LINE READOUT

[75] Inventor: Victor Perez-Mendez, Berkeley, Calif.

[73] Assignee: The Regents of the University of California, Berkeley, Calif.

[22] Filed: July 9, 1973

[21] Appl. No.: 377,504

Related U.S. Application Data

[62] Division of Ser. No. 176,009, Aug. 31, 1971, Pat. No. 3,772,521.

[52] U.S. Cl. ............ 333/31 R, 333/31 C, 333/84 R
[51] Int. Cl. ............................................. H03h 7/30
[58] Field of Search ........ 333/29, 31 R, 31 C, 84 R, 333/84 M

[56] References Cited
UNITED STATES PATENTS 3,177,451   4/1965   Swanson ........................... 333/31 R
3,418,606   12/1968  Adams ............................. 333/31 R
3,599,122   8/1971   Leuthold ....................... 333/31 C X Primary Examiner—James W. Lawrence
Assistant Examiner—Marvin Nussbaum
Attorney, Agent, or Firm—Fleur, Hohbach, Test, Albritton & Herbert

[57] ABSTRACT

A proportional chamber having a plurality of output conductors carrying signals indicative of the location of an event detected within the chamber and using delay lines capacitatively coupled to said conductors for receiving signals through an intermediate portion of the side wall winding of the delay line. Delay times are measured to give a readout of the position and existence of the event.

6 Claims, 6 Drawing Figures

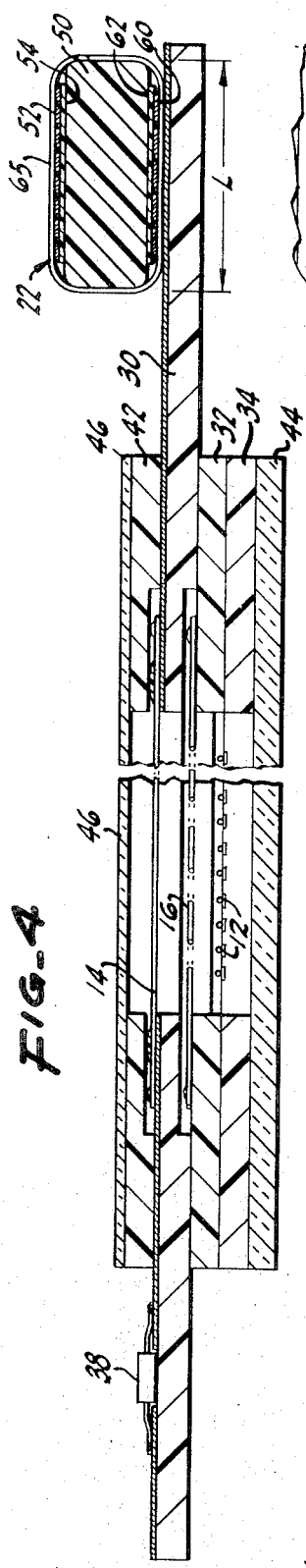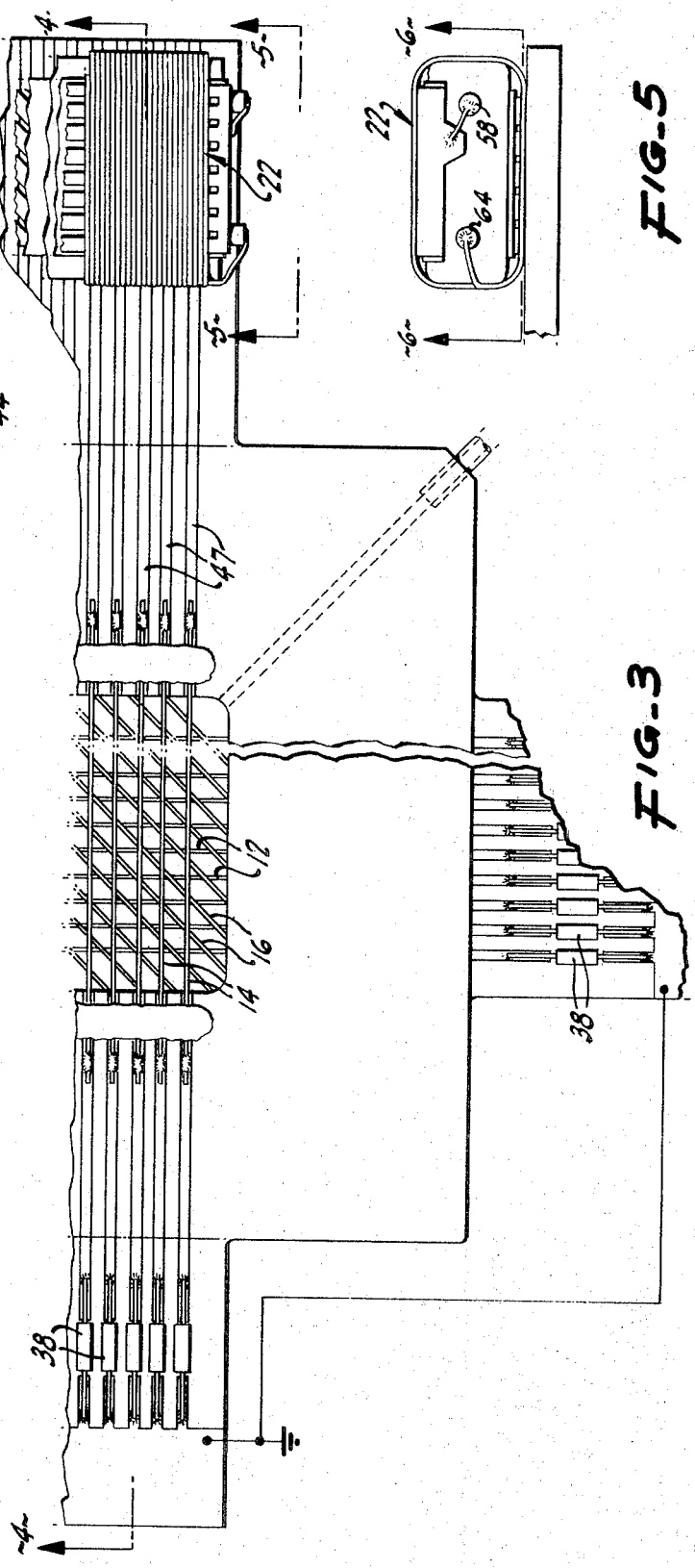

RADIATION CAMERA AND DELAY LINE READOUT

This is a division of application Ser. No. 176,009 filed Aug. 31, 1971, now U.S. Pat. No. 3,772,521, issued Nov. 13, 1973.

The invention was made in the course of or under Contract W-7405-ENG-48 with the Atomic Energy Commission of the United States of America.

BACKGROUND OF THE INVENTION

This invention relates to a radiation camera and more particularly to an improved proportional chamber and delay line readout for γ-ray and X-ray radiography.

Heretofore, extended source radiography for detection of γ-ray and other high energy photons, particularly in medical applications, in which a radioactive isotope distribution is studied, have commonly utilized scintillators for converting such radiations to light pulses, the location of which is by photo-multipliers or image amplifiers and subsequently processed. Generally, collimators are used to limit the region exposed to the scintillator to thereby better resolve the information present. The foregoing instruments are relatively expensive and complicated and have inadequate spacial resolution, which becomes unacceptably poor at energies below about 80 Kev.

Where proportional chambers have been previously used for high energy photon or other particle detection, they have usually required a large number of individual electronic amplification circuits in order to process the resulting data.

For point source x-ray detection, film has been commonly used. However, in some X-ray procedures the dose rates required are sufficiently high so that they are dangerous to health. There is, therefore, a need for an improved radiation camera and for a delay line readout.

SUMMARY OF THE INVENTION AND OBJECTS

In general, it is an object of the present invention to provide an improved radiation camera and delay line readout which will overcome the foregoing limitations and disadvantages.

Another object of the invention is to provide a radiation camera and delay line readout of the above character which has a usefully resolved readout and which can effectively operate with relatively low dose rates and low energy sources and which also images distribution of gamma ray or other radioisotope patterns used in clinical medicine.

Another object of the invention is to provide a radiation camera and delay line readout of the above character having discrete electrical pulse signal output readily adapted to digital processing, such as by computers.

Another object of the invention is to provide a delay line readout device having physical access by capacitive coupling to points along its length, the delay from which is accurately proportional to the point of access.

In general, the present invention is achieved by using a xenon filled multiwire proportional chamber having a planar configuration and including a plurality of spaced wire grids arranged at substantial angles to each other. A high voltage is impressed on the grids such that a photon passing through the chamber generates an avalanche of electrons which collect on those wires in the proximity to produce detectable electrical signals. A delay line readout is mounted across the wires of each grid and is capacitively coupled to them. The delay line is so constructed that it provides access along its length for these electrical signals to enter the line, the delay of signal appearing at the ends of the line being proportional to and a direct measure of the position at which the signal entered. The delay times are measured by suitable electronic circuits and compiled either on an oscilloscope or computer memory to give a readout.

These and other features and objects of the invention will become apparent from the following description when taken in conjunction with the accompanying drawings, of which:

BRIEF DESCRIPTION OF THE DRAWINGS

FIG. 3 is a plan view partially broken away of the radiation camera with delay line readout of FIG. 1.

FIG. 4 is a cross-sectional view taken along the lines 4—4 of FIG. 3.

FIG. 5 is a cross-sectional view taken along the lines 5—5 of FIG. 3.

DETAILED DESCRIPTION OF THE PREFERRED EMBODIMENTS

Figures 1, 6:
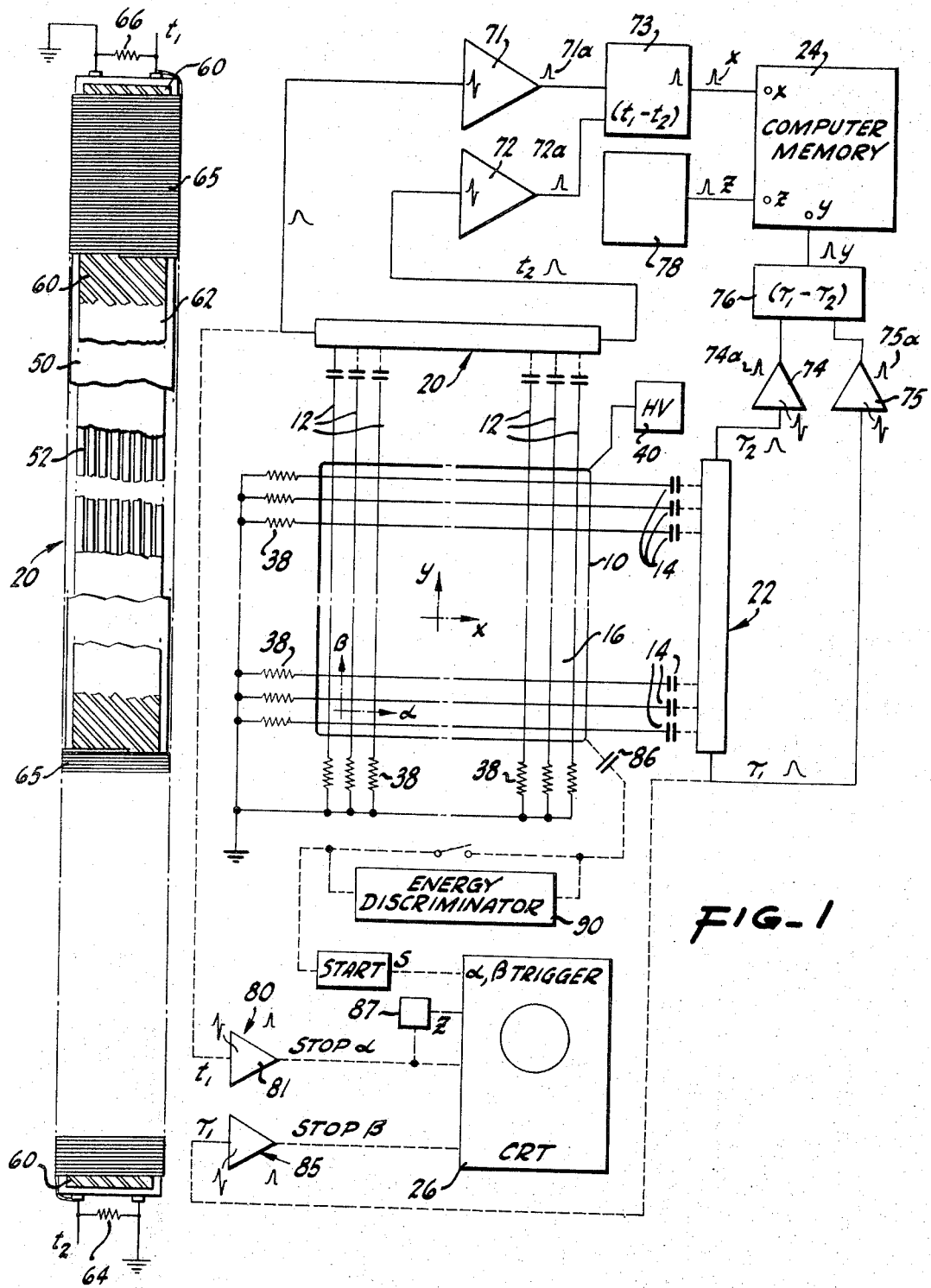
FIG. 1 is a schematic drawing of the electrical circuit of a radiation camera with delay line readout constructed in accordance with the present invention.
FIG. 6 is a cross-sectional view, partially broken away, taken along the lines 6—6 of FIG. 5 and illustrating the construction of a delay line as used in the present invention.
Figure 2:
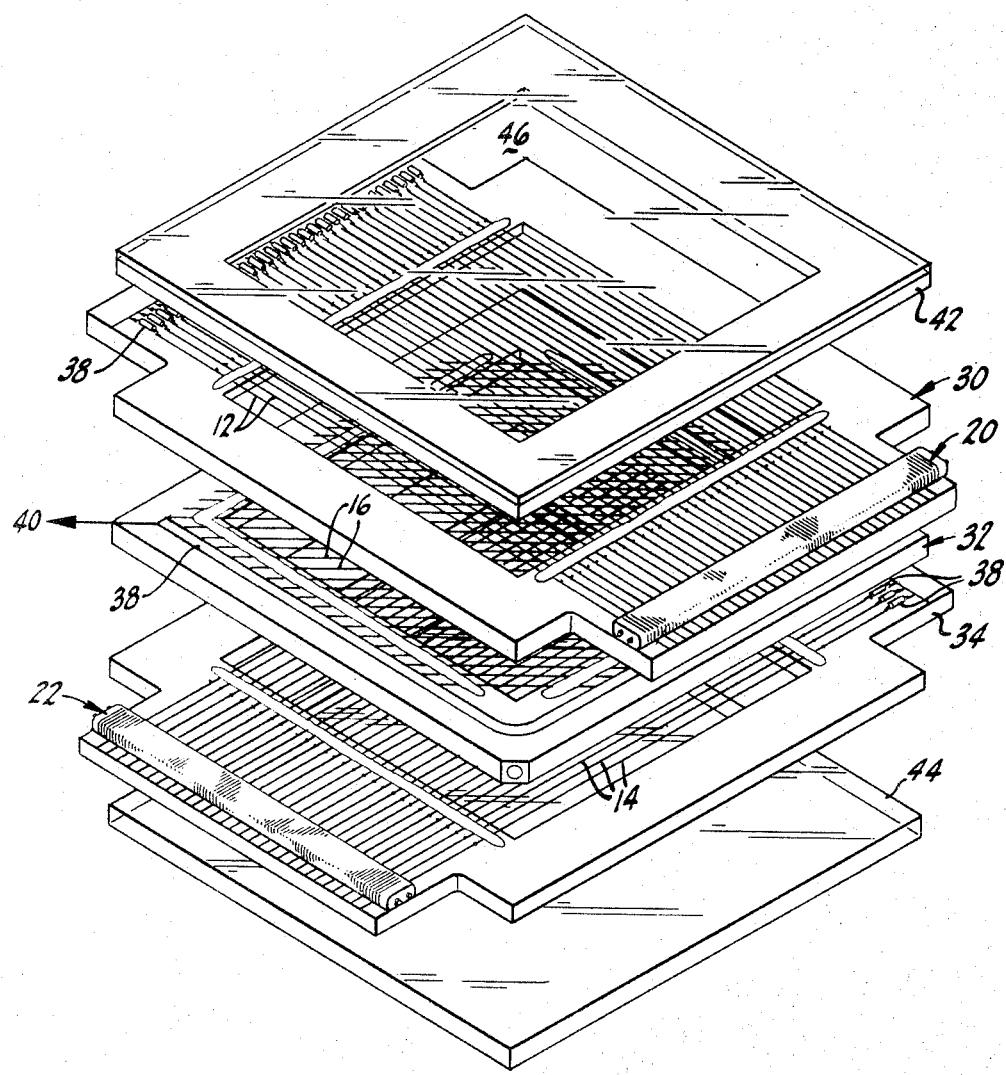
FIG. 2 is an exploded isometric view of the proportional chamber and delay lines of the present invention.

Referring particularly to FIG. 1, the general arrangement of the radiation camera of the present invention is set forth, and consists of a generally planar proportional chamber 10 which preferably contains a first set of grid wires 12 arranged in a predetermined direction and a second set of grid wires arranged at right angles to thereby define a cartesian coordinate system $x,y$. Each of the grid wires is individually connected through a resistor to ground.

A third set of grid wires 16 is provided and is arranged at 45° to each of the first and second grids and is connected to a source of high voltage, say at, for example, about 3,000 volts. The third grid wires 16 are commonly termed an avalanche grid. The proportional chamber is closed and filled with a suitable avalanche gas, such as xenon, such that entry of photon causes a photoelectric dissociation and an electron avalanche which is collected on the avalanche grid and causes an induced electrical pulse to appear on the first and second grids 12, 14. These induced electrical pulses appear on those particular grid wires in the vicinity of the event and are capacitively coupled to an intermediate portion of associated electrical delay lines 20, 22. The capacitive coupling is by proximity, the delay line merely being positioned contiguous to an extension of each of the first and second set of grid wires.

As shown in FIG. 1 in solid lines, one system for obtaining a visible readout consists of measuring the difference in time $(t_1-t_2)$, $(\tau_1-\tau_2)$ of the pulses received from both ends of the delay lines, the coordinates $x,y$ being taken from the center of the proportional chamber. The time difference of each event is applied to a computer memory 24 and accumulated to thereby obtain a readout, as will be more fully described hereinafter.

An alternative procedure is shown in dotted lines in which a start signal S is taken from the pulse appearing on the avalanche grid. The delay lines time signal $t_1, \tau_1$ are used to provide stop signals $\alpha B$ which represent a coordinate system taken from one side of the chamber and which is applied to the $x, y$ input of an oscilloscope 26. In each procedure, the occurrence of an event is sensed by a suitable circuit which causes an unblanking signal $z$ to be simultaneously applied to the oscilloscope or computer.

Referring now more particularly to FIGS. 2 – 5, there is shown the proportional chamber constructed in accordance with the present invention and consisting of a gas-tight chamber having the three sets of wire grids stretched on suitable frames 30, 32, 34. Each of the frames is similar in construction and is made of suitable insulative material such as Nema G-10 fiberglass epoxy having a generally planar, rectangular conformation and provided with a square aperture therein across which the wires are stretched and secured in position by a glue line. Each wire of grids 12 and 14 terminate at one end to a common ground through individual resistors 38, which, for the particular example shown herein, have a value of 200 K$\Omega$. The wires of the first and second sets of grids 12, 14, that is to say the outside planes, are arranged at 90° to each other to define coordinate system previously mentioned and they are made of, for example, gold-coated molybdenum wire. The central grid 16 is made of gold-coated tungsten wire, the ends of which are soldered to a copper bar 39 and connected to a source of high voltage 40. Each of the grids thus includes a plurality of closely spaced parallel wires extending in a predetermined direction, the directions of the grounded outer set of grids being at a substantial angle to each other to define the system of coordinates over the area of the chamber. Most conveniently, the system of coordinates is cartesian and the grids are placed as shown at right angles to each other. Each of the wire grids 12, 14 is connected to a circuit board 41 which precisley extends each grid wire laterally away from the chamber and permits the mounting of a delay line across each of the circuit boards. The circuit board is precisely aligned with the grid wires so that the occurrence of a pulse on any given grid wire is maintained positionally accurate out to the delay line.

The chamber is assembled together with top and bottom plates 42, 44 to form a gas-tight box, the top plate including a square aperture for admitting photons. The outside of the aperture is sealed with an aluminized mylar window 46, and filled at atmospheric pressure with a xenon mixture, for example, which can consist of 94.5 percent xenon, 5 percent carbon dioxide and ½ percent Freon 13B-1, in which the $CO_2$ and Freon serve to prevent sparking and to quench the discharge.

The operation of the proportional chamber is as follows: An X-ray photon entering the active volume of the chamber has a high probability of converting its energy into an electron through the photoelectric effect. The electron will have a certain energy which is the same as the X-ray minus the binding energy of the electron in xenon. This energy will be deposited within a small region usually in the form of ionization of the gas. Due to the electric field between the grounded outer planes and the high voltage inner plane, secondary electrons will be formed by ionization and will drift towards the avalanche grid wires and will undergo multiplication in a small region of wires to produce a voltage pulse on the avalanche grid. Similarly, an induced pulse of opposite polarity is generated on the outer sets of grid wires 12, 14 by the initial motion of positive ions produced in the electron ionization process. The induced pulses on the outer grids appear in positionally accurate location on the corresponding grid wires and on the circuit board and the associated delay line.

Referring now to FIGS. 3 and 4, the detail of the circuit board is shown. Thus, each of the sets of grid wires 12, 14 is shown fastened at each end by cement or glue line soldered to a corresponding conductive strip 47 on respective circuit board 41. The conductive strips extend outwardly and under the flat side of the delay line and are accurately aligned with the wires so each pulse is delivered to the delay line in an accurate position intermediate on its length which corresponds to the position of the associated wire within the chamber itself.

In a more general sense, the proportional chamber serves together with a radiation source having an output directed into a predetermined area as detecting means for detecting the distribution and location of radiation in that area and for delivering electrical pulses to a plurality of external conductors having a well defined positional relationship to the position at which the radiation passed through the detecting means. Delay line means are capacitatively coupled to said conductors having a length spanning said conductors whereby a signal on any of said conductors is coupled laterally into an intermediate position of said delay line, means for receiving electrical signals from said delay line and for measuring the amount of delay of the signals which then are accumulated to give a readout of the distribution of events in said area. The delay line has means distributed uniformly along its length for balancing out any dispersion and thereby maintain pulse shape. The delay line structure will now be described.

The position indicating delay line is shown more particularly in FIGS. 3 through 6 and consists generally of an elongate insulating core 50 having a uniform cross section throughout its length and at least one generally planar side wide enough to span a substantial length L of the conductive strips 47 over which it is mounted. A ground plane is provided and consists of a plurality of conductive strips 52 such as copper formed on a suitable mylar backing 54. The ground plane strips are placed parallel, having uniform width and extend along the length of the delay line in general alignment therewith and are connected at each end to a ground terminal 58. It has been found sufficient to provide a ground plane on one side only of the device.

Means uniformly distributed along the delay line is provided for compensating for dispersion inherent in the delay line because of the effect of inductance of the helical winding which surrounds it and consists of a second plurality of conductive strips 60, such copper or aluminum formed on a mylar backing 62 and positioned at a pitch of about 45° to the length of the device. This compensating means is ungrounded and forms electrically floating patch which provides a compensation for such dispersion, the amount of compensation being adjustable by varying the pitch or orientation angle of the compensating conductive strips relative to the length of the delay line and noting experimentally the optimum value.

The delay line is completed by being wrapped with a closely helical winding 65 of No. 30 gauge copper or conductive wire, the ends of which are connected to a respective one of terminals 64, 65 and terminated in a matching resistance 66. The helical winding is wrapped such that it is nearly normal to the conductors of the ground plane 52. The delay line geometrical configuration provides for electrical coupling between the conductors of the circuit boards and particular ones of the helical winding of the delay line so that a pulse is generated within the delay line and propagates to its ends in a time precisely related to its point of entry. By providing a rectangular cross section having at least one flat side, a relatively high capacitive coupling to the conductive strips 47 coefficient is obtained. Delays of from 40 to 200 milliseconds per centimeter of delay line length have been achieved with very uniform correspondence between the electrical performance of the delay line and the delay line length, that is to say, a precise, linear relationship exists between the location of entry of a signal into the sidewall of the helical winding and the delay times measured. A further feature of the delay line is that it has an absence of ferromagnetic or magnetic material in it which would affect its characteristics in the presence of magnetic fields. One specific example of such a delay line was 2.5 cm wide by 0.3 cm in cross-section, and nearly 60 cm long. The wound length was 57 cm wound at 34 turns per cm. The ground plane strip width was 3 cm and had a total area of 170 $cm^2$. A total capacity of the delay line was 4.7 $nF$, giving 83pF/cm and an inductance of 1.9 at 10 KHz. Total delay of the line was 2.7 $\mu sec$, with a delay of 47.7 $nsec$ per cm.

The capacitive coupling to the delay line has the effect of differentiating the input step from function appearing on the wire grids, which, combined with inherent dispersion of the delay line, produces a somewhat imprecise pule. However, by using the compensating strip path 60, it is possible to achieve a clean pulse, whose arrival can be timed to an accuracy of 1 nanosecond. Both the compensating patch and the ground plate strips were formed of metal strips on a mylar base, the strips being 1.8 mm wide, with 0.3 mm wide gaps. The mylar was 25$\mu$ thick.

Referring again to FIG. 1 and the operation of the camera of the present invention the electronic readout circuitry can now be discussed in detail. Thus, as shown, both outputs $t_1$, $t_2$, taken from delay line 20 are passed through differentiators 71, 72 which provide signal pulses 71a, 72a as each differentiated signal passed the zero point. This pulse in turn is combined and subtracted in a time-to-height converter scaler 73 such that the scaler output pulse 76, and polarity corresponds to the magnitude of the time delay difference. This signal is applied to the X-input of the computer memory 24. Similarly, output pulses $\tau_1$, $\tau_2$ are processed through differentiators 74, 75 to provide output pulses 74a, 75a indicative of the zero crossing and subtracted in a time-to-height converter and scaler 76 to thereby provide an output signal $y$ having a magnitude corresponding to the delay and a polarity corresponding to the polarity of the combined input signal. An unblanking circuit 76 provides a pulse drive $z$ for triggering a gate to signal each event that takes place.

An alternate procedure using oscilloscope 26 is shown in dotted lines wherein a start signal S for referencing zero time is taken from the avalanche grid through capacitor 80 and is connected to trigger the internal sweep generator of the oscilloscope for both $\alpha$ and $\beta$ directions. Pulses $t_1$ and $\tau_1$ are processed through a differentiating and pulse-forming networks 81, 85 to produce output signals $\alpha$, $\beta$ having a delay in time from signals and are applied to the scope to stop the $\alpha, \beta$ sweep. A suitable circuit 87 provides a pulse $z$ for unblanking the electron beam in the CRT trace so that a spot of light becomes visible at the coordinate of the event. Accumulation of data is achieved by leaving the CRT trace exposed to suitable camera (not shown).

A further feature of the delay line readout is that the pulses produced in the delay line can be the scum of the induced signals from more than one of the conductors 47, and the delay line integrates there into a single pulse, the center of which is a more accurate indication of the location of the event in the chamber.

The foregoing radiation camera and delay line are found to have a high detection efficiency for X-rays commonly used in diagnostic radiology and through electrical amplification every detected event can be made visible in a final picture. Since the image is obtained from electrical signals, the radiation camera of the present invention affords the opportunity to obtain and use digital data and digital processing. The spacial resolution of the chamber was found to be greater than the inter-wire spacing which indicates the possibility of interpolation of the location of an event which actually occurs between the wires. A typical spacial resolution of the order of 1 mm has been obtained with a wire spacing of 2mm and it is expected that this can be improved. Such a resolution is quite acceptable although inferior theoretically to film. However, the comparison of final picture quality readout of film is not particularly unfavorable since factors other than film resolution limit the performance of more conventional X-ray systems, including focal spot size, geometry, small angle scattering, subject movement and the like. In addition, the proportional chambe of the present invention and readout can provide imaging of radiations over predetermined energy bands because of the ability to select by amplitude discrimination such as a band pass filter 90 responsive to pulses of a limited range of energies a narrow band of x-ray energies from a wide range output of a standard X-ray tube, so that the energy and contrast can be matched to the study of interest.

In addition X-ray energy levels below 80 Kev and as low as 5 Kev can be utilized in radiology with the present camera. In a typical application a $\gamma$-ray source such as cadmium-109 was placed 12 cm above the chamber and the pictures obtained at 22 Kev were comparable to that produced by conventional X-ray apparatus.

In the operation of the present invention the electrical configuration of the fields at the multiplication wires shows that if an ionizing event occurs somewhere between two wires it will drift towards one of the wires and produce a signal at that point. Thus position information will be quantized in a direction perpendicular to the wire direction and the resolution cannot be better than wire spacing. However, in the direction aligned with a grid, a signal will be produced at the same location where the conversion has Occurred and no quantization should be evident. Thus the induced signals on the outside planes are spread over many wires and since the delay line picks the center of gravity of the event, that center of gravity can be easily interpollated to distances smaller than the wire spacing. Thus, where the resolution in the direction perpendicular to the multiplication wire is given by the wire spacing, while in the direction parallel to the wires, the resolution was found to be at the order of 0.2 mm. By using the central avalanche grid, with its wires oriented at 45° to the wires on the outside grids 12 and 14, the $x,y$ response of the chamber is made symetrical and a spacial resolution of about 1 mm is obtained in both $x$ and $y$ directions.

To those skilled in the art to which the present invention pertains many modifications and adaptations of the invention will occur. For example, while there has been disclosed herein a proportional chamber having planar geometry, there are other geometeries in which such chambers would be usefully employed, an example being cylindrical, which would find use in crystal diffraction studies or other work where cylindrical geometry naturally occurs. Thus, where planar is used herein it should be interpreted broadly to include other useful geometries.

Also, there has been shown a particular form of wire grid proportional chamber, however, other forms of chambers or other devices may prove useful in this invention and need only be of a character that an output signal pulse appears on selected ones of a plurality of conductors, the occurrence and location of which one claims to measure. Accordingly, the disclosures given herein are to be taken as a specific example of one form of the practice of the present invention and not in a limiting sense.

I claim:

1. A position indicating delay line having distributed signal access along its length in which the delay of the signal is proportionate to the distance from the point of signal application to at least one end thereof, comprising an elongate insulating plug having uniform cross-section throughout its length, a plurality of spaced parallel longitudinal conductive strips extending along the length of the plug to form a ground plane, a closely spaced conductive winding helically wrapped about said plug and nearly normal to said ground plane conductive strips to form an inductive winding thereon, a plurality of spaced parallel elongate strips positioned adjacent said winding and at an angle thereto, means forming a plurality of spaced conductors having portions positioned in closely spaced relation to said helical windings and generally running in the same direction as said windings, means for terminating the end of said ground plane and said helical winding in a characteristic impedance at each end thereof.

2. A delay line as in claim 1 further including means forming a plurality of conductive signal paths spaced in accurate alignment with a plurality of positionally spaced signal events, said delay line having a planar face positioned proximate said conductors such that the helical windings thereof are in substantial alignment therewith.

3. A delay line as in claim 1 in which said ground plane comprises a plurality of thin conductive strips interposed between said helical winding and said core.

4. A delay line as in claim 1 further including a compensating network consisting of a floating patch of conductive strips positioned adjacent said helical winding and oriented at substantial angle to each of said ground plane strips and said helical winding said patch being electrically isolated from said ground plane and said winding and oriented to balance out the dispersion inherent in said windings.

5. A delay line as in claim 1 in which said core is made of magnetically non-responsive material.

6. A position indicating delay line having distributed signal access along its length in which the delay of the signal is proportionate to the distance from the point of signal application to at least one end thereof, comprising an elongate insulating core having uniform cross-section throughout its length, a ground plane secured to said core, a closely spaced conductive winding helically wrapped about said core to form an inductive winding thereon, means uniformly distributed along said delay line for compensating the dispersion of said winding for any signal entering an intermediate position along said delay line, means forming a plurality of spaced conductors having portions positioned in closely spaced relation to said helical windings and generally running the same direction as said windings, said conductors having random signals thereon related to positional information to be decoded, means for terminating the end of said ground plane and said helical winding in a characteristic impedance at each end thereof.

* * * * *